2,707,676

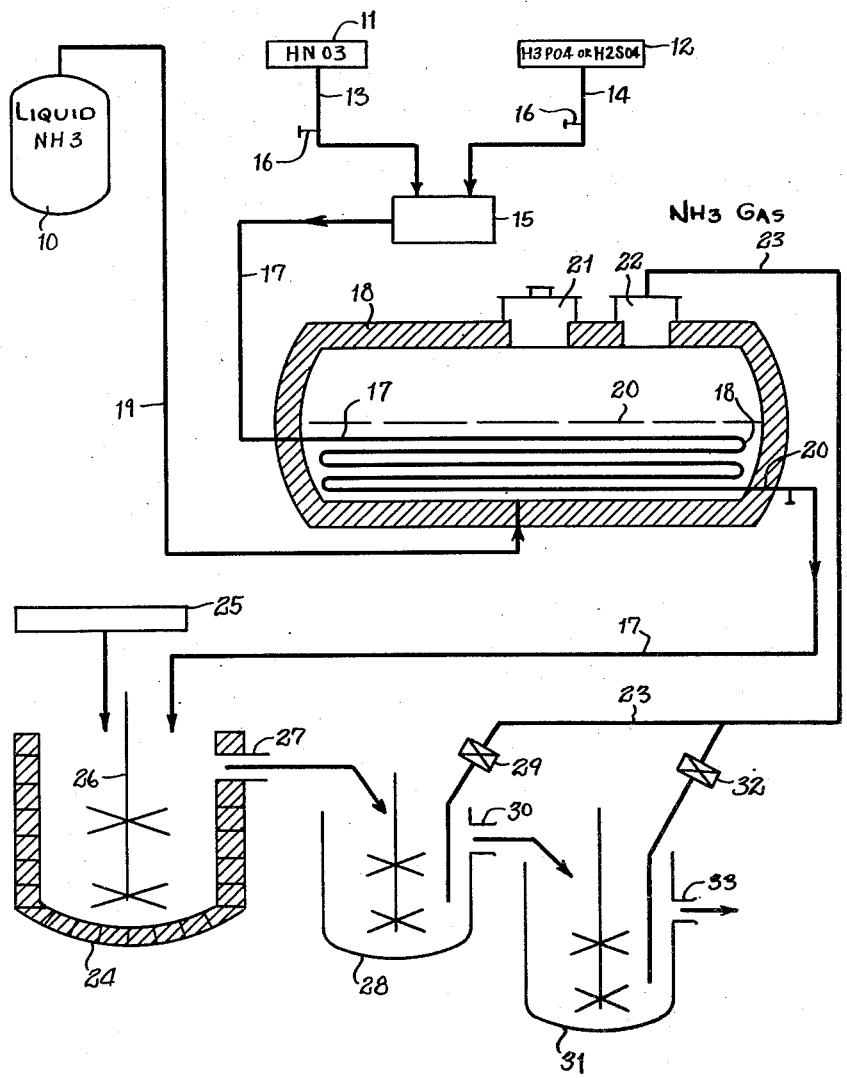

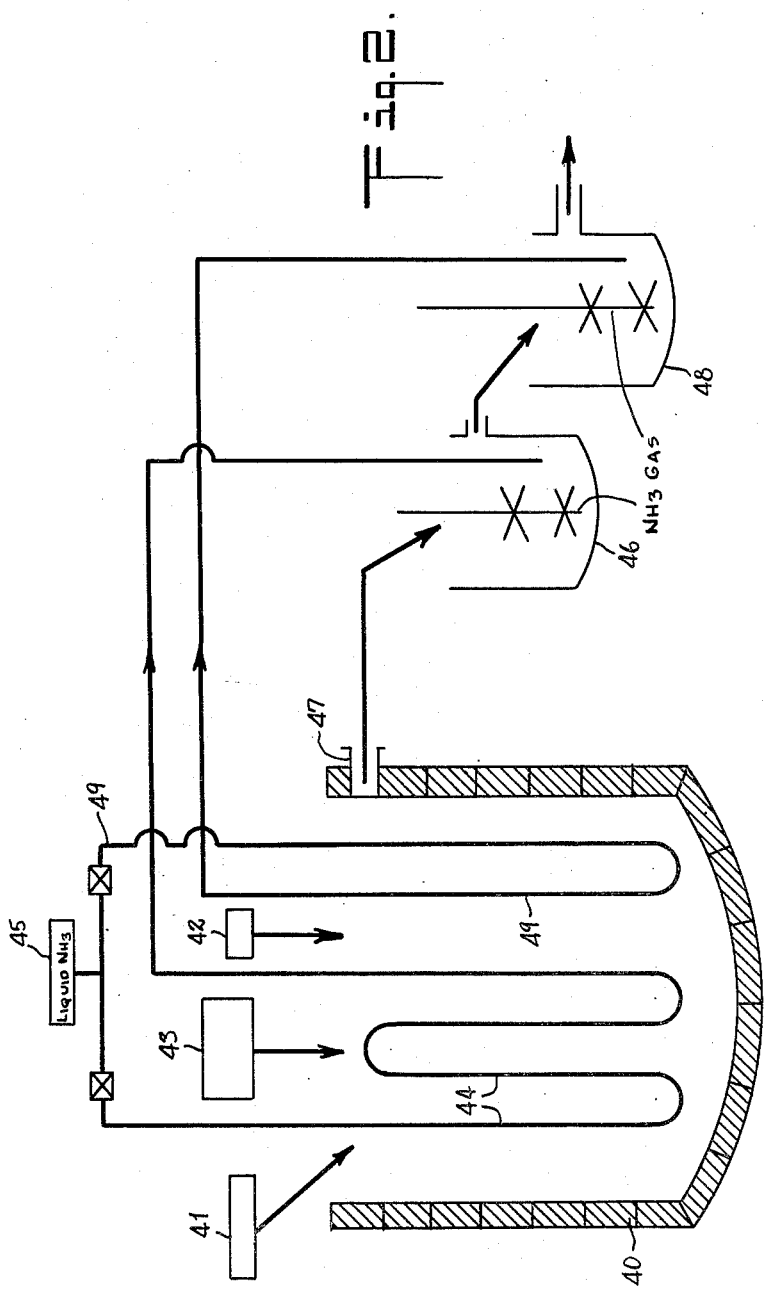

MANUFACTURE OF PHOSPHONITRITE FERTILIZERS

Lucien Picot, Paris, and Yves Martin, Grand-Quevilly, France, assignors to Societe Anonyme des Manufactures des Glaces et Produits Chimiques de Saint-Gobain, Chauny & Cirey, Paris, France Application February 6, 1952, Serial No. 270,138

5 Claims. (Cl. 71—39)

The present invention relates to an improvement in the manufacture of fertilizers by the reaction of phosphatic materials of fertilizer grade, such as natural phosphate, by means of an acid comprising nitric acid; nitric acid may be used alone or with a mixture of other acids, followed by ammoniation of the acid reaction product thus obtained so as to neutralize and transform all or a part of the calcium nitrate to ammonium nitrate.

The invention is particularly concerned with that portion of the process of making fertilizer from natural phosphate in which the natural phosphate is attacked or "opened" by acid. This acid attack is exothermic and the ammoniation which follows it is also exothermic. Now, the exothermic nature of the ammoniation has been at least partially beneficial because it has been possible to use the heat of reaction released within the mass to drive off some of the water and concentrate the reaction mass. On the other hand, the heat liberated during the course of the acid attack on the natural phosphate has been considered harmful because the rise in temperature causes the release of important quantities of nitrogen which escape and are lost, while at the same time, the reaction undergoes a change as the heat is liberated and side reactions introduce impurities into the product, among which the release of fluorides is particularly objectionable because they increase the consumption of acid and attack the material of which the apparatus is constructed. Several proposals have been made to improve these conditions, such as the addition of different acids to the raw material at different times, and the cooling of the reaction mass by passing a cooling liquid through a water jacket surrounding the reaction vat, but the first of these proposals loses the benefit of a direct attack on the phosphate by mixed acids and requires a more complex apparatus, while the second has proved to be inefficient and incapable of exercising an adequate control of temperature rise, while inducing the deposit on the walls of the vat of salt deposits and incrustations which are objectionable per se, but also because they obstruct the exchange of heat. Even under the most favorable conditions of such cooling it has not been feasible heretofore to reduce the temperature below 60° C. in the reaction vats, and that temperature introduces the imperfections described.

It is an object of this invention to prepare fertilizer by a novel process, in novel apparatus, and to control the temperature of the reaction mass during the attack on natural phosphate by mixed acids, whereby to retain the reaction mass at a lower temperature, to reduce the loss of nitrogen from such vats, to check side reactions, to reduce the formation of impurities in the reaction mass, and to lengthen the life of the apparatus in which the fertilizer is made.

The objects of the invention are obtained generally speaking, by vaporizing ammonia in refrigerating contact with the mixed acid employed in the attack on the phosphate, and by passing the ammonia thus vaporized into reactive contact with the product formed by that attack. In one method of carrying out the invention the acids are mixed, for instance nitric acid and sulphuric acid, or nitric acid and phosphoric acid, resulting in the tendency to liberate heat, but according to the invention, the mixed acids are put in contact with refrigerating coils in which ammonia is vaporized and the acid thus chilled is transferred to the reaction vat with the raw phosphate of fertilizer grade, which is to be opened. The product produced by the reaction is led to another vat and the ammonia thus vaporized during the acid attack is introduced to it. More than one nitration vat may be provided and served in like manner. By this method the objects of the invention are obtained.

In another method of carrying out the invention, natural phosphate is admitted to the vat with mixed acids, and ammonia is vaporized in refrigerator coils in the reaction mass, the overflow from the vat going into the second vat, which also receives the vaporized ammonia from the coils. In this way also the objects of the invention are obtained.

In this invention vaporization of all or a part of the ammonia that serves for the ammoniation of the product of acid attack, lowers the temperature of the reaction mass and avoids the imperfections which have been the bane of the prior art. The advantages which are obtained from this process are particularly marked, because the liberation of impurities from the natural phosphate, and the loss of ammonia are rapidly reduced as the temperature of the reaction mass is drawn down into the range provided by this process. It is our discovery that, at the same time, the speed of the attack on the phosphate raw material is practically independent of the temperature and proceeds about as well at the low temperature provided as at those which have heretofore been essential.

When the ammonia is vaporized in refrigerating contact with the acids before their introduction into the vat, particularly when a mixture of acids is employed in the reaction, it is beneficial to mix them together in advance in order to benefit from the rise in temperature which accompanies the mixing to initiate an increased heat exchange with the ammonia in the refrigerating conduits. For instance, the mixture may be introduced into a tubular coil immersed in liquid ammonia at atmospheric pressure, that is to say, at a temperature about —35° C. It is also possible to lead the mixture of acids counter-current around a tube containing the ammonia. It has been proved in practice that in this way it is easy to lower the temperature of the mixed acids to about —10° C. and that these acids when reacted at that temperature with the phosphate produce a reaction mass maximum temperature which does not exceed about 50° C. and is frequently considerably lower. This method of accomplishing the invention produces a mean difference in temperature in the apparatus on the order of 35° C., and when the heat exchanging surface is of the same area as that employed in a prior art vat with a double water jacket, the advantages sought and hereinbefore illustrated are obtained without the formation of deposits or crusts. However, there is another method of carrying out the invention which produces additional benefits.

In this particular advantageous method, the vaporization of ammonia is employed to refrigerate the acid phosphate reaction mass directly, and this attains unexpected advantages. These advantages may be explained in the following way, although the existence of the invention does not depend upon the explanation of this invention; when according to the prior art process, the reaction vat is cooled by water at the temperature of the water mains, it has been shown that the thermal exchange is not noticeably improved by increasing the flow of water, that is to say, by lowering the temperature of water issuing from the water jackets. Similarly, if the temperature of the incoming water is lowered by refrigeration, or if refrigerated brine is used, the improvement which results is negligible and substantially no improvement occurs. It has been observed that the coefficient of transmission of heat from the reaction mass to the cooling liquid, is on the order of 250 calories per square meter of wall surface of the exchanger per hour, per degree centigrade difference in temperature, these figures being computed with water issuing at 25° C., and that the coefficient is about 125 calories with cold brine issuing at 4° C. On the contrary (this is regarded as surprising), the coefficient of heat transference from the reaction mass to ammonia under the conditions of this invention is on the order of 400 calories. Some of this advantage is believed to be due to the fact that the heat exchange is activated by the ammonia because of its vaporization, but it is also due in part to the fact that the reaction mass gives up its heat more readily because the deposits and crusts which impaired the flow of heat in prior apparatus do not have the same obstructive effect in this invention. This surprising improvement is believed to be due in part to the fact that the deposits are of a different nature which is less adherent to the refrigerated wall, and in part to a difference in quantity, nature, and crystalline form in these deposits.

Other advantages arise from the facts that the refrigerating surface may be reduced, in this form of the invention, to about ⅓ of that which is necessary with double cooling walls, and that the production of a constant temperature of 50° or less in the reaction mass is feasible as compared to the 60° which was the feasible minimum with prior systems. As noted above, the speed of the attack on natural phosphate is not influenced substantially by the temperature (for example, it is 97.5% at 45° C. as compared to 98% at 60° C., in 15 min.), and as a consequence, the employment of this invention enables one to use a much smaller apparatus, of which the volume may be only ⅓ of that of the best prior art apparatus, and consequently to save a material amount of capital in constructing the plant. Furthermore, it has been observed that the corrosion of the metal parts of the apparatus is negligible in comparison to a relatively rapid attack in similar parts of prior apparatus.

As the temperature of vaporization of ammonia is —35° C. and the temperature in the acid reaction vat may be maintained at 50° C., there is a temperature difference in the heat exchanger of 85° C. which results in the extraction from that vat of great quantities of heat. Another advantage of this invention is that that heat is not lost, but is transferred to an ammoniation vat where it aids in removing water by evaporation from the product undergoing ammoniation. To accomplish this, the ammonia from the reaction vat, or from the refrigeration of the mixed acids, is passed into reactive engagement with the mass in the ammoniation vat. Thus, not only the ammoniation reaction itself liberates heat usefully, but the heat extracted from the acid reaction vat is usefully combined with it.

The apparatus that has been conceived for the accomplishment of this invention is of the simplest, and in its preferred form omits the double water jackets characteristic of the more efficient prior art structures and employs simple refrigerating coils, which may for example be of stainless steel. One suitable form of cooling coil consists of a simple reverse bend in a pipe immersed in the material in the vat. By reason of this invention it is possible to construct the acid reaction vats of acid resistant brick, which are practically permanent, thus eliminating all the problems of corrosion which have heretofore attended the production of fertilizers from natural phosphate by the reaction of mixed acid including $HNO_3$.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views.

Fig. 1 is a diagrammatic view of one form of apparatus for carrying out the invention;

Fig. 2 is a diagrammatic view of a preferred form of the invention.

In Fig. 1 the numeral 10 indicates a source of liquid ammonia, 11 a source of nitric acid and 12 a source of sulphuric acid or phosphoric acid. The acid sources 11 and 12 are connected by pipes 13, 14 respectively, to a mixing tank 15, each pipe line being supplied with a valve 16 for regulation of the flow in the pipe. The tank 15 containing the mixed acids is connected by a pipe 17 to an evaporator 18, into which the pipe extends and through which it passes in a plurality of return bends 18, emerging at 20. The pipe 17, which is preferably stainless steel, is localized in the lower part of the vaporator. The source of liquid ammonia 10 is connected by a pipe line 19 to the evaporator 18 and in the operation of the apparatus, the evaporator is filled to the level 20 by the liquid ammonia. The evaporator is provided with a safety valve 21 and with a vapor dome 22 through which the ammonia vaporized in the evaporator passes to pipe 23. The acid emerging from the evaporator in the pipe 17 is poured into an acid reaction vat 24 where it is mingled with phosphate fertilizer of grade such as natural phosphate or certain phosphatic slags which are supplied from a source 25. The reaction vat 24 is provided with a stirrer 26 and with an overflow discharge 27 through which the reaction product of the acid attack passes to the first ammoniation vat 28. The vat 24 is composed of acid resistant brick. Into the vat 28 there passes through pipe line 23 and valve 29 the gaseous ammonia from evaporator 18 which is discharged, into the reaction product filling the vat 28, toward the bottom thereof. The ammoniated product from vat 28 is discharged through an overflow 30 into a second ammoniation vat 31 which is shown as of identical construction and which may be supplied with further quantities of ammonia from the pipe line 23 through valve 32. The finished product is discharged through an overflow port 33.

The process performed in this apparatus has been described hereinabove. As stated, either nitric acid or mixed acid, can be put in the tank 15, and passes thence through the evaporator in refrigerating contact with liquid ammonia in the evaporator, which is kept at a very low temperature by its vaporization around the pipe 17. The cold acid then passes through the pipe 17 into the vat 24 where it is mixed with phosphate from source 25. The reaction proceeds at low temperature with the reduction of side reactions, but without harmfully affecting the main reaction, and the product passes by overflow to the ammoniating vat 28 where it is ammoniated by the ammonia issuing from the evaporator 18. As many ammoniating vats may be employed as desired.

In Fig. 2, a reaction vat 40 receives phosphate from a source 41, nitric acid from a source 42 and, if desired, a sulphuric or phosphoric acid from a source 43. The reaction is strongly exothermic and the temperature is controlled by the vaporization of ammonia from pipes 44 which extend with return bends close to the bottom of the vat and are supplied with liquid ammonia with a source 45. The ammonia vaporized in the pipe 44 passes to vat 46 and near the bottom thereof is discharged into the reaction product which issues from the top of vat 40 through discharge means 47 into vat 46. A second ammoniation vat 48 may be provided and may be served by a separate refrigerator line 49 issuing from source 45 and discharging near the bottom of vat 48. Vat 48 receives the overflow product from vat 46.

In a modification of the process and apparatus, of Fig. 1, the preliminary refrigeration of the acid may be obtained by putting the acid in the vaporizer and the ammonia in the refrigerating coil, making the necessary changes in mechanical connections.

Each of the refrigerators has a heat exchange service calculated to permit the vaporization of those quantities of ammonia necessary to supply the ammoniation vats.

In an apparatus such as shown in Fig. 2, it is possible to open 1500 kgs. of moroccan phosphate per hour with 2900 kgs. per hour of a sulphuric nitric acid mixture containing 700 kgs. of sulphuric acid of 60° Bé. and 2200 kgs. of nitric acid of 26° Bé., employing a vat containing 1.5 cubic meters of space and including two refrigerating coils of which the submerged surface is about 2.5 square meters in area. The reaction mass requires about 300 kgs. of ammonia for neutralization per hour, and that is entirely evaporated in the refrigerator coil before being discharged into the ammoniation vats. The temperature of the acid reaction mass in the first vat is easily kept at 50° C. The raw materials and acid with which it reacts remains in the acid reaction vat on the order of 30 min. before being discharged as a reaction product to the first ammoniation vat, and the yield of completely reacted product is about 99%. The losses of nitrogen are less than 1% whereas in prior processes, in which the temperature of the mass rose to the neighborhood of 75° C., there were losses of 4 to 5% of nitrogen. Despite its small volume (1.5 m.$^3$) the apparatus when operated in accordance with the principles herein set forth, produces on the order of 5 metric tons per hour of fertilizer of the type 10 N, 10P$_2$O$_5$, 15K$_2$O.

As many apparently widely different embodiments of the present invention may be made without departing from the spirit and scope thereof, it is to be understood that the invention is not limited to the specific embodiments.

What is claimed is:

1. In the method of making fertilizer that comprises reacting raw phosphatic material of fertilizer grade with acid comprising nitric acid and reacting the product with ammonia, the steps that comprise bringing the acid into heat exchanging relationship with liquid ammonia but out of contact therewith, thereby vaporizing the ammonia and cooling said acid, reacting the thus cooled acid with the phosphatic material, and passing the thus vaporized ammonia into reactive contact with the reaction product of said acid and phosphatic material.

2. The process of claim 1 in which the temperature of the reaction mass is maintained below about 50° C.

3. The method of making ammoniated fertilizers that comprises passing fluid acid of fertilizer grade comprising nitric acid into raw phosphate materials of fertilizer grade, and mixing them to form a fluid reaction mass, removing reaction products from said reaction mass, and maintaining the temperature of said reaction mass below an upper limit about 50° C. by vaporizing liquid ammonia in heat exchanging relationship with, but out of contact with said reaction mass, and passing the ammonia thus vaporized into the reaction products so removed.

4. In the method of making fertilizer that comprises reacting raw phosphatic material of fertilizer grade with acid comprising nitric acid and reacting the product with ammonia, the steps that comprise bringing the acid into heat exchanging relationship with liquid ammonia but out of contact therewith and out of contact with the raw phosphatic material, thereby vaporizing the ammonia and cooling said acid, passing the thus cooled acid into reactive contact with the said phosphatic material, and passing the thus vaporized ammonia into reactive contact with the reaction product of said acid and phosphatic material.

5. In the method of making fertilizer that comprises reacting raw phosphatic material of fertilizer grade with acid comprising nitric acid and reacting the product with ammonia, the steps that comprise mixing the acid with the phosphatic material, bringing liquid ammonia into heat exchanging relationship with the mixed acid and phosphatic material, but out of contact therewith, thereby vaporizing the ammonia and cooling said mixture of acid and phosphatic material below about 50° C., and passing the thus vaporized ammonia into reactive contact with the reaction product of said acid and phosphatic material.

References Cited in the file of this patent

UNITED STATES PATENTS

| Number | Name | Date |
|---|---|---|
| 1,003,681 | Williams | Sept. 19, 1911 |
| 1,876,501 | Johnson | Sept. 6, 1932 |
| 1,922,682 | Holz | Aug. 15, 1933 |
| 1,980,008 | Shoeld | Nov. 6, 1934 |
| 1,999,026 | Tramm et al. | Apr. 23, 1935 |
| 2,067,019 | Riegler | Jan. 5, 1937 |
| 2,087,889 | Bacon et al. | July 27, 1937 |
| 2,089,957 | Harris et al. | Aug. 15, 1937 |
| 2,439,432 | Keenan | Apr. 13, 1943 |
| 2,557,955 | Ewing | June 26, 1951 |
| 2,614,040 | Kaikinger | Oct. 14, 1952 |

FOREIGN PATENTS

| Number | Country | Date |
|---|---|---|
| 357,473 | Great Britain | Sept. 24, 1931 |
| 357,509 | Great Britain | Sept. 7, 1931 |
| 383,434 | Great Britain | Nov. 17, 1932 |